United States Patent
Hishon

(10) Patent No.: US 12,055,164 B2
(45) Date of Patent: Aug. 6, 2024

(54) HOOD LIFTING ACTUATOR WITH LOCKING RING

(71) Applicant: Joyson Safety Systems Acquisition LLC, Auburn Hills, MI (US)

(72) Inventor: Michael Hishon, New Baltimore, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/731,906

(22) Filed: Apr. 28, 2022

(65) Prior Publication Data

US 2022/0349427 A1 Nov. 3, 2022

Related U.S. Application Data

(60) Provisional application No. 63/182,315, filed on Apr. 30, 2021.

(51) Int. Cl.
*F15B 15/26* (2006.01)
*B60R 21/38* (2011.01)

(52) U.S. Cl.
CPC .............. *F15B 15/26* (2013.01); *B60R 21/38* (2013.01)

(58) Field of Classification Search
CPC .......... F15B 15/26; B60R 21/38; B60R 21/00
See application file for complete search history.

(56) References Cited

U.S. PATENT DOCUMENTS

| 7,650,957 | B2 | 1/2010 | Takakura et al. | |
| 7,946,376 | B2 * | 5/2011 | Hayashi | B60R 21/38 |
| | | | | 180/274 |
| 9,221,422 | B2 | 12/2015 | Henck | |
| 9,545,895 | B2 * | 1/2017 | Wilmot | B60R 21/38 |
| 2009/0223360 | A1 * | 9/2009 | Aoki | B60R 21/38 |
| | | | | 92/15 |
| 2015/0183693 | A1 | 7/2015 | Aoyama | |

FOREIGN PATENT DOCUMENTS

| AT | 524574 B1 * | 7/2022 | | |
| DE | 102015111801 A1 * | 1/2016 | ............ | B60R 21/38 |
| JP | 200856120 A | 3/2008 | | |

* cited by examiner

*Primary Examiner* — Kenneth Bomberg
*Assistant Examiner* — Daniel S Collins
(74) *Attorney, Agent, or Firm* — Meunier Carlin & Curfman LLC

(57) ABSTRACT

A hood lifting actuator according to various implementations includes a piston, a locking ring, and a housing including a protrusion. The housing further includes a distal end, the distal end defining a distal end wall, wherein the locking ring is retained between the distal end wall and the protrusion prior to actuation of the actuator. The piston travels from a retracted position to an extended position. In the extended position, the hood lifting actuator lifts a portion of a vehicle hood into an elevated position. In response to a force urging the piston from the extended position toward the retracted position, such as a person impacting the portion of the vehicle hood, the locking ring engages the protrusion and the piston, thereby locking the piston in a locked position.

19 Claims, 15 Drawing Sheets

HOOD LIFTING ACTUATOR WITH LOCKING RING

CROSS-REFERENCE TO RELATED APPLICATIONS

This application claims the benefit of U.S. Provisional Patent Application No. 63/182,315, filed Apr. 30, 2021, the contents of which are incorporated herein by reference in their entirety.

BACKGROUND

A hood lifting actuator may be mounted on a motor vehicle for lifting a portion of a vehicle hood (for example, a rear portion of the hood proximate the windshield, or another portion of the hood) in a situation where the vehicle collides with a pedestrian. When actuated, the actuator raises the hood portion from its normal rest position to an elevated position. However, when the hood portion is in the elevated position, forces produced by an impact on the hood by a pedestrian may cause the actuator to retract. Some motor vehicle manufacturers desire to maintain the hood portion in the elevated position before, during, and after impact by the pedestrian.

Therefore, there is a need for a low cost, easy to manufacture actuator that can lock itself from retracting, thereby ensuring the hood portion remains in the elevated position.

SUMMARY

Various implementations include a hood lifting actuator that includes a housing including a fixed internal volume, a central axis, an inner surface, a distal end, and a proximal end, the distal end defining a distal end wall extending at least partially radially inwardly toward the central axis. The housing includes a protrusion that extends inwardly toward the central axis. A gas generator is coupled to the proximal end. A piston is slidably engaged with the inner surface of the housing, and the piston is movable axially from a retracted position to an extended position. A first surface of the piston is disposed adjacent the proximal end of the housing in the retracted position and is disposed adjacent the distal end of the housing in the extended position.

A locking ring is retained between the distal end wall and the protrusion prior to the piston traveling from the retracted position to the extended position. The protrusion has a first inner diameter, and the housing has a second inner diameter between the protrusion and the distal end wall and a third inner diameter between the protrusion and the proximal end, the second and third inner diameters being equal to each other and greater than the first inner diameter. The locking ring prevents the piston from traveling from the extended position to the retracted position.

In some implementations, the housing further includes an outer surface that forms a wall with the inner surface. The wall has a thickness that is measured radially from the inner surface to the outer surface, wherein the thickness is constant through a length of the wall and the protrusion between the proximal end and the distal end wall of the housing.

In some implementations, the piston includes a piston head and a piston rod. In some implementations, the piston head and the piston rod are integrally formed. In some implementations, the piston rod includes a wide portion and a narrow portion. The narrow portion is adjacent to the piston head. A diameter of the wide portion is greater than a diameter of the narrow portion. In some implementations, the locking ring engages the wide portion when the piston is in the retracted position. In some implementations, the locking ring is disengaged from the wide portion and is radially adjacent the narrow portion when the piston is in the extended position.

In some implementations, the piston rod further includes a transition portion between the wide portion and the narrow portion. In response to a force urging the piston from the extended position toward the retracted position, the locking ring engages the transition portion. In some implementations, the transition portion defines a tapered surface that tapers from the wide portion to the narrow portion. In some implementations, in response to the force urging the piston from the extended position toward the retracted position, the locking ring further engages the protrusion, thereby locking the piston in a locked position.

In some implementations, the actuator further includes an energy damper disposed around the narrow portion. In some implementations, the actuator further includes an energy damper disposed around the wide portion.

In some implementations, the locking ring is a toroidal snap ring with a circular cross section. In some implementations, the locking ring is a washer snap ring with a rectangular cross section. In some implementations, the locking ring extends less than 360 degrees around the piston.

In some implementations, the housing further defines gas relief openings. In some implementations, the actuator further includes a sleeve covering the gas relief openings. In some implementations, the sleeve includes acrylonitrile butadiene styrene (ABS). In some implementations, the sleeve defines a shoulder, and the first surface of the piston rests on the shoulder in the retracted position. In some implementations, the sleeve defines a cavity, and the gas generator is disposed at least partially within the cavity.

BRIEF DESCRIPTION OF DRAWINGS

Example features and implementations are disclosed in the accompanying drawings. However, the present disclosure is not limited to the precise arrangements and instrumentalities shown. Like reference numerals designate corresponding parts throughout the drawings.

DETAILED DESCRIPTION

Figure 1A:
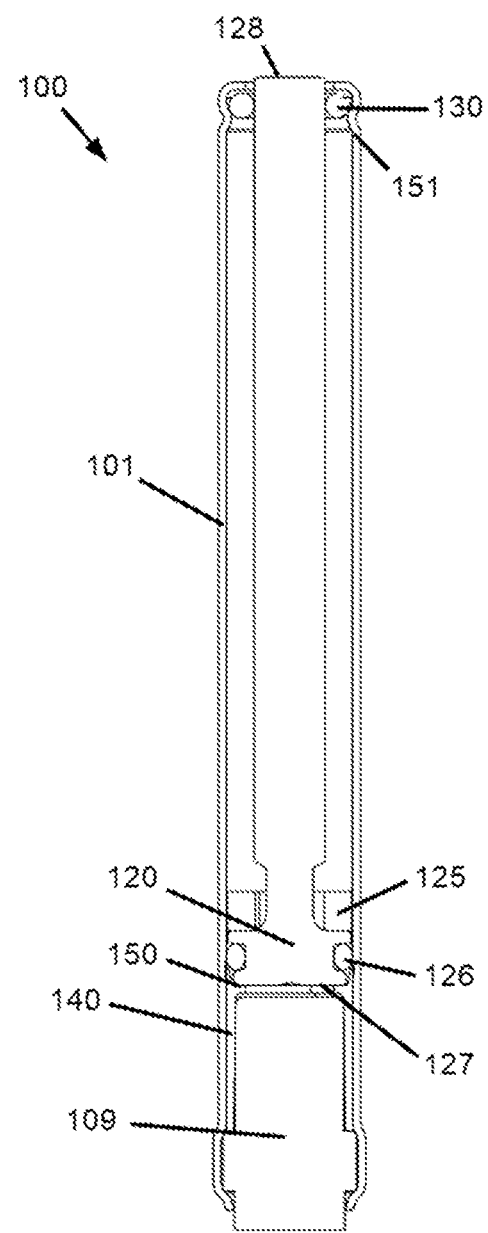
FIGS. 1A-1B are cross-sectional views of a fully assembled actuator according to one implementation.

The devices, systems, and methods disclosed herein provide for an actuator having a locking feature. The actuator can be included in a hood lifting mechanism for lifting the hood of a vehicle, for example. The actuator includes a housing and a piston slidably engaged with an inner surface of the housing, and the housing includes a protrusion adjacent a distal end of the housing. A locking ring is disposed adjacent the distal end and the protrusion, and the locking ring engages the piston and the protrusion in a locked position of the actuator.

Referring to FIG. 1, an actuator 100 of a first implementation includes a housing 101, a piston 120, a locking ring 130, and a gas generator 109. The piston 120 includes a first surface 127 and a second surface 128. When the actuator 100 is actuated, the second surface 128 pushes against a portion of a hood of a motor vehicle, lifting the hood to an elevated position. The locking ring 130 prevents the piston 120 from moving back into a retracted position.

Figure 2:
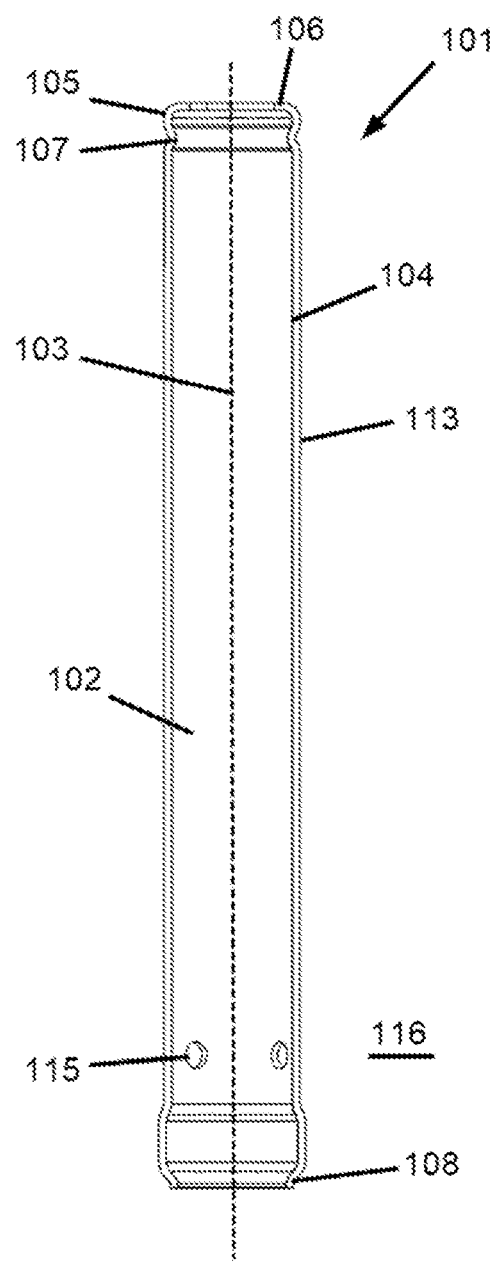
FIG. 2 is a cross-sectional view of a housing of the actuator of FIGS. 1A-1B.
Figure 3:
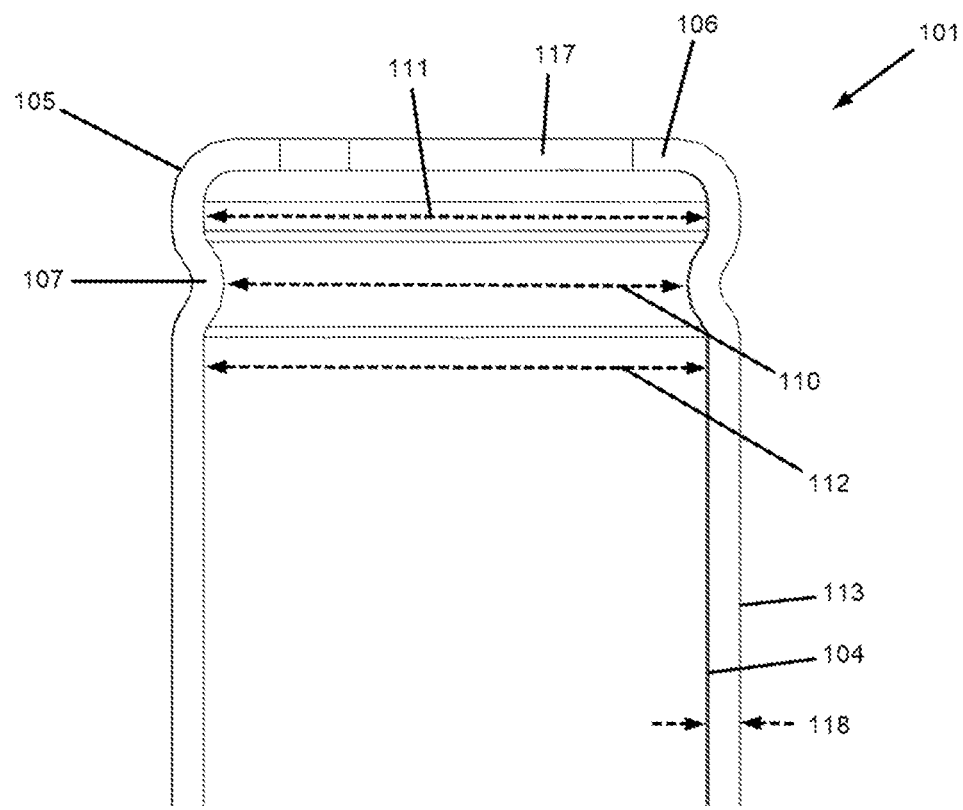
FIG. 3 is another cross-sectional view of the housing of FIG. 2.

Housing 101, as shown in FIGS. 2-3, includes a fixed internal volume 102, a central axis 103 that extends from a proximal end 108 of the housing 101 to a distal end 105 of the housing 101, and an inner surface 104. The distal end 105 defines a distal end wall 106 which at least partially extends radially inwardly toward the central axis 103, and the distal end wall 106 defines an opening 117 through which at least a portion of the piston 120 extends. The housing 101 further includes a protrusion 107 that extends inwardly toward the central axis 103. The protrusion 107 is axially adjacent and spaced apart from the distal end wall 106. The protrusion 107 has a first inner diameter 110, and the housing 101 has a second inner diameter 111 between the protrusion 107 and the distal end wall 106 and a third inner diameter 112 between the protrusion 107 and the proximal end 108, the second and third inner diameters 111, 112 being equal to each other and greater than the first inner diameter 110. Housing 101 may be made from steel. However, in other implementations, the housing may be made from any appropriate material to satisfy its intended purpose. In other implementations, the second diameter and the third diameter may not be equal to each other.

The housing 101 further includes an outer surface 113 that forms a wall with the inner surface 104. A thickness 118 of the wall, which is measured radially from the inner surface 104 to the outer surface 113, is constant through a length of the wall and the protrusion 107 between the distal end wall 106 and the proximal end 108. For example, the housing 101 is crimped to form the protrusion 107. In other implementations, the protrusion can be formed by other suitable processes for reducing the inner diameter of this portion of the housing, such as inserting a component through the wall of the housing or installing a cap adjacent the distal end wall, the cap defining the protrusion.

As shown in FIG. 2, housing 101 defines gas relief openings 115, enabling fluid communication between the fixed internal volume 102 and an external environment 116 outside of the housing 101. Sleeve 140, which is shown in FIGS. 1A-1B and 6A-6B, is disposed within the housing 101 adjacent the proximal end 108 and covers the gas relief openings 115, preventing fluid communication between the fixed internal volume 102 and the external environment 116 during normal operation of the actuator 100. In a high-pressure event, the sleeve 140 may be destroyed, thus allowing fluid communication between the fixed internal volume 102 and the external environment 116, thereby preventing further structural damage to the actuator 100. The sleeve 140 defines a shoulder 141 and a cavity 142. The gas generator 109 is disposed at least partially within the cavity 142.

In the event the actuator 100 is in communication with an external heat source, such as a fire that heats the actuator 100 and causes the sleeve 140 to be heated above a threshold temperature, the sleeve 140 melts, allowing fluid communication between the external environment 116 and the fixed internal volume 102 of the housing 101 through the gas relief openings 115. The threshold temperature is defined as the melting temperature of the sleeve 140. Therefore, in the event the gas generator 109 actuates in response to the external heat source after the sleeve 140 melts, high-pressure gases from the gas generator 109 flow to the external environment 116 through the gas relief openings 115, reducing the pressure on the first surface 127 of the piston 120. This event is one example of a "dry fire" event, wherein the actuator 100 is actuated without resistance from an external force, such as the hood of the vehicle. During a dry fire event, a risk may be that the piston 120 may be driven with too much energy and could fully exit the housing 101. Therefore, reducing the pressure on the first surface 127 of the piston 120 reduces this risk. The sleeve 140 may include a plastic material, for example acrylonitrile butadiene styrene (ABS) with a melting temperature of approximately 220 degrees Celsius, ensuring the sleeve 140 decomposes before the gas generator 109 actuates in response to the external heat source. In other implementations, the sleeve may be made from any other material capable of melting before the gas generator actuates automatically in response to the external heat source, such as other plastic materials and certain metals.

Figure 1B:
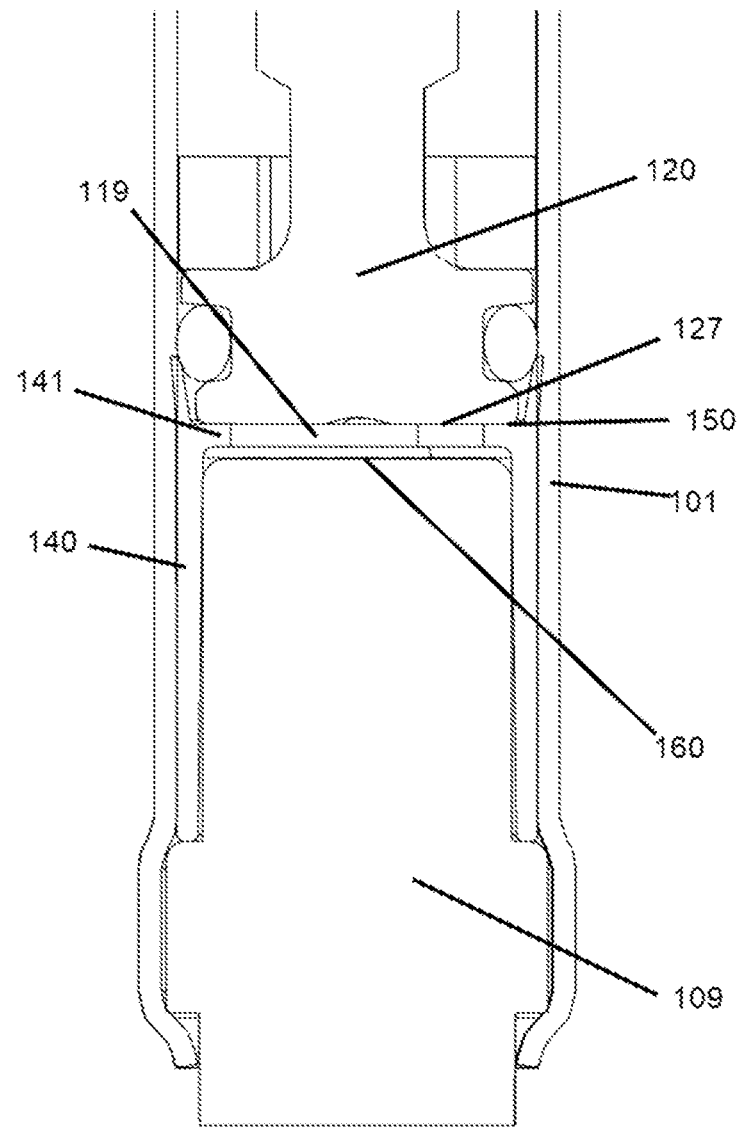
Figure 5:
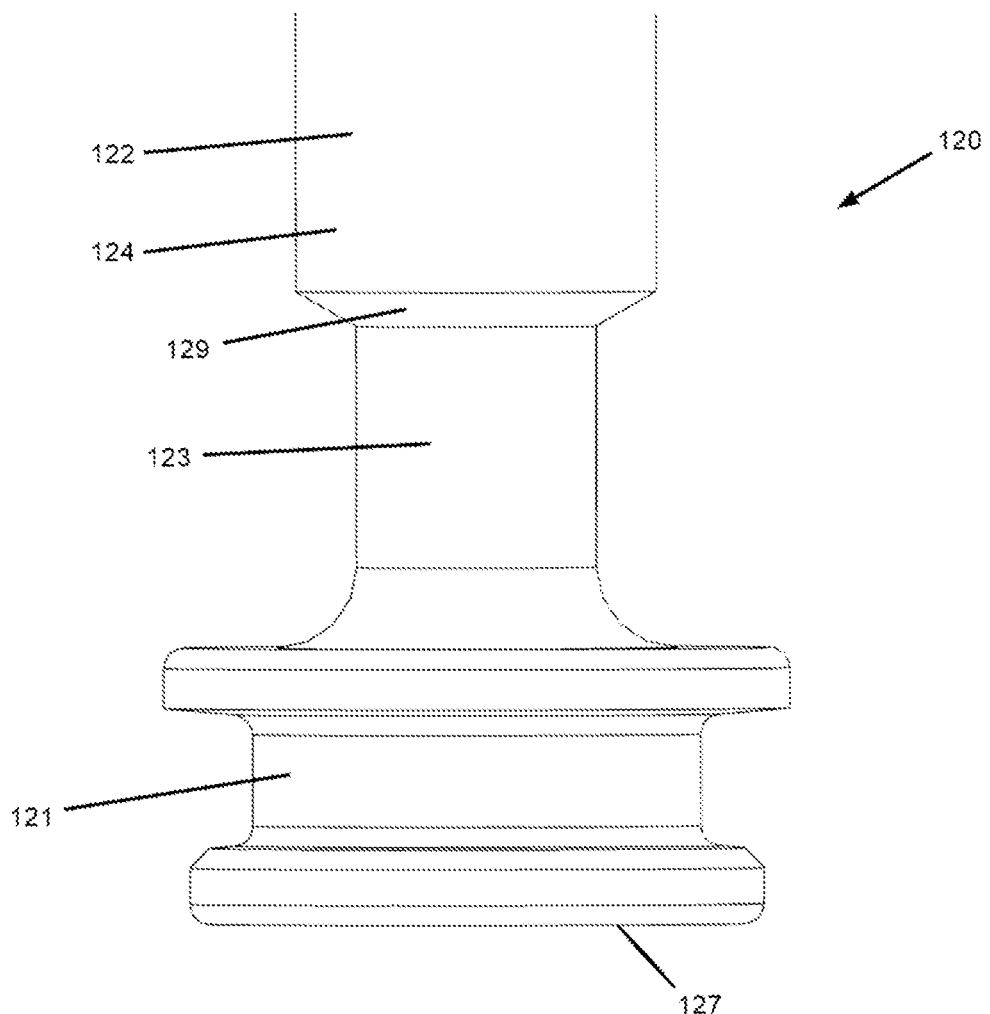
FIG. 5 is a view of a piston of the actuator of FIGS. 1A-1B.
Figure 6A:
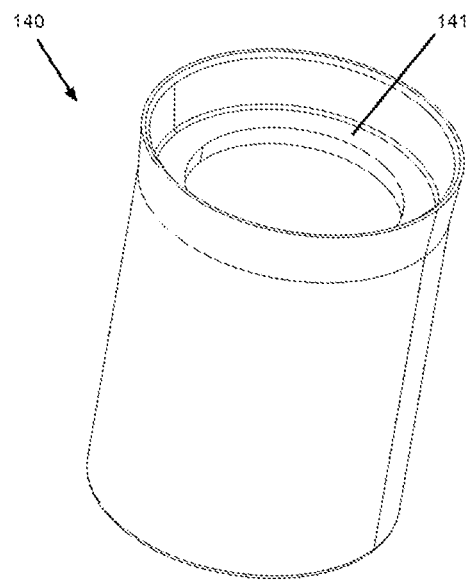
FIGS. 6A-6B are views of a sleeve of the actuator of FIGS. 1A-1B.
Figure 6B:
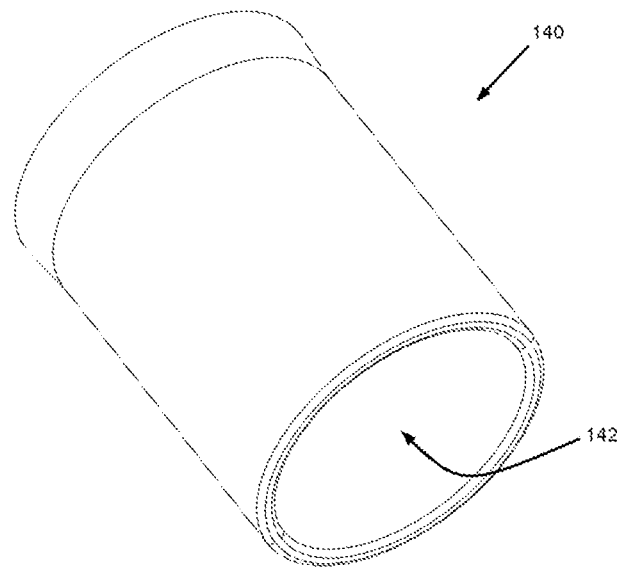

Piston 120 includes a piston head 121 and a piston rod 122. As shown in FIG. 5, the piston head 121 and piston rod 122 are integrally formed in one unitary piece. The first surface 127 is a proximal surface of the piston head 121, and the second surface 128 is a distal surface of the piston rod 122. Before actuation, the first surface 127 rests upon the shoulder 141 of the sleeve 140, as shown in FIGS. 1A-1B. The piston rod 122 includes a wide portion 124, a narrow portion 123, and a transition portion 129 between the wide portion 124 and narrow portion 123. A diameter of the wide portion 124 is greater than a diameter of the narrow portion 123. The narrow portion 123 is closer to the piston head 121 than the wide portion 124. Transition portion 129 defines a tapered surface that tapers from the wide portion 124 to the narrow portion 123. In other implementations, the transition portion is a 90-degree shoulder portion or has any other contour that transitions from the wide portion to the narrow portion. In other implementations, the piston head and piston rod may be formed separately and coupled together. The piston 120 may be made from steel. However, in other implementations, the piston may be made from any appropriate material to satisfy its intended purpose.

An energy damper 125 and an o-ring 126 are disposed about a circumference of the piston 120 and are axially spaced apart from each other. As shown in FIG. 1A, the o-ring 126 is disposed within a circumferential groove defined by the piston head 121, and the energy damper 125 is disposed circumferentially around the narrow portion 123 of the piston rod 122. In other implementations, the energy damper may be disposed about a different portion of the piston rod. The energy damper 125 and o-ring 126 may be made from EPDM. In other implementations, the energy damper and o-ring may be made from any appropriate material to satisfy their intended purpose.

Figure 4:
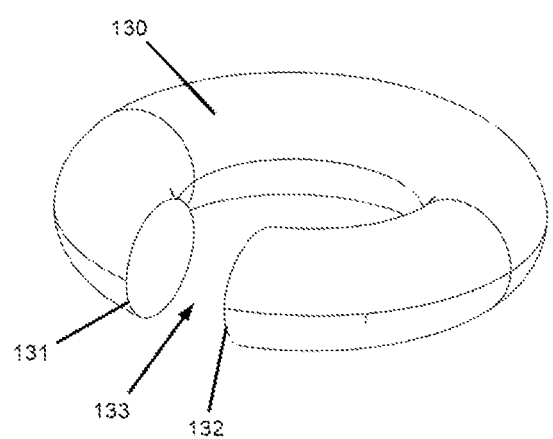
FIG. 4 is a view of a locking ring of the actuator of FIG. 1A.

As shown in FIG. 1A, a locking ring 130 is retained axially between the protrusion 107 and the distal end wall 106. As shown in FIG. 4, the locking ring 130 includes a toroidal shaped snap ring with a circular cross section, a first end 131, and a second end 132. The cross-sectional shape of the locking ring 130 is the shape as viewed in a plane that is perpendicular to a centroidal axis of the locking ring 130. A gap 133 is defined by and between the first end 131 and second end 132, therefore the locking ring 130 extends less than 360 degrees around the piston 120. The inner diameter of the locking ring 130 is less than the diameter of the wide portion 124 of the piston rod 122, so that when the locking ring 130 is around the wide portion 124 of the piston rod 122, the first end 131 and second end 132 are forced circumferentially apart from each other and a circumferential distance of the gap 133 is increased. However, the first end 131 and second end 132 are biased toward each other so that the first end 131 and second end 132 will snap back to their resting positions when the locking ring 130 is not around the wide portion 124 of the piston rod 122, reducing the circumferential distance of the gap 133. The locking ring 130 may be made from steel. However, in other implementations, the locking ring may be made from any appropriate material to satisfy its intended purpose. In other implementations, the locking ring may have any cross-sectional shape, such as circular, rectangular, square, or any other shape that can satisfy its intended purpose.

Figure 7A:
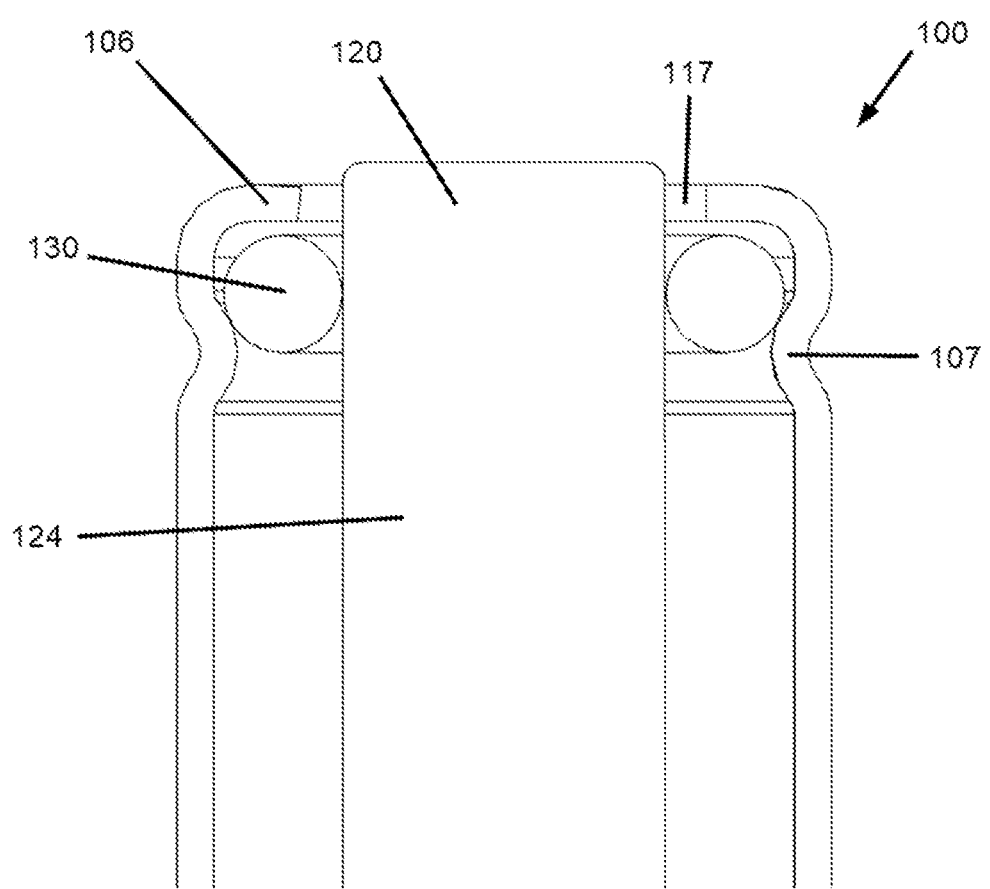
FIGS. 7A-7C are cross-sectional views of the actuator of FIGS. 1A-1B in a retracted position, an extended position, and a locked position, respectively.
Figure 8A:
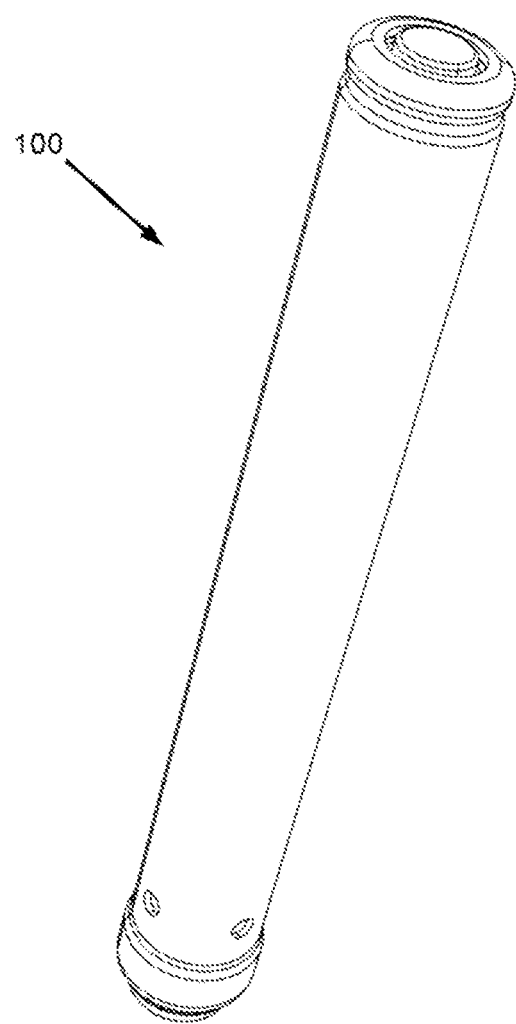
FIGS. 8A-8C are additional views of the actuator of FIGS. 1A-1B in the retracted position, the extended position, and the locked position, respectively.

Turning now to the operation of the actuator 100, the piston 120 is in a retracted position before actuation, as shown in FIGS. 7A and 8A. In the retracted position, the locking ring 130 is retained axially between the protrusion 107 and the distal end wall 106 and circumferentially around at least a portion of the wide portion 124 of the piston rod 122. Actuation occurs when an actuation signal is sent from a vehicle electronic control unit (ECU) to the gas generator 109, causing the gas generator 109 to introduce high-pressure gas into an actuation chamber 119 defined between the first surface 127 of the piston 120 and a distal surface 160 of the gas generator 109. In the retracted position, as shown in FIG. 1B, the first surface 127 of the piston 120 rests upon the shoulder 141 of the sleeve 140 axially spaced apart from the distal surface 160 of the gas generator 109, thus defining the volume of the actuation chamber 119. Upon actuation, the high-pressure gas pushes on the first surface 127 of the piston 120, causing the second surface 128 and at least a portion of the piston rod 122 to extend out of the housing 101 through the opening 117 of the distal end wall 106. The o-ring 126 forms a seal between the piston 120 and the inner surface 104 of the housing 101, keeping the high-pressure gas in the actuation chamber 119 throughout operation of the actuator 100.

Figure 7B:
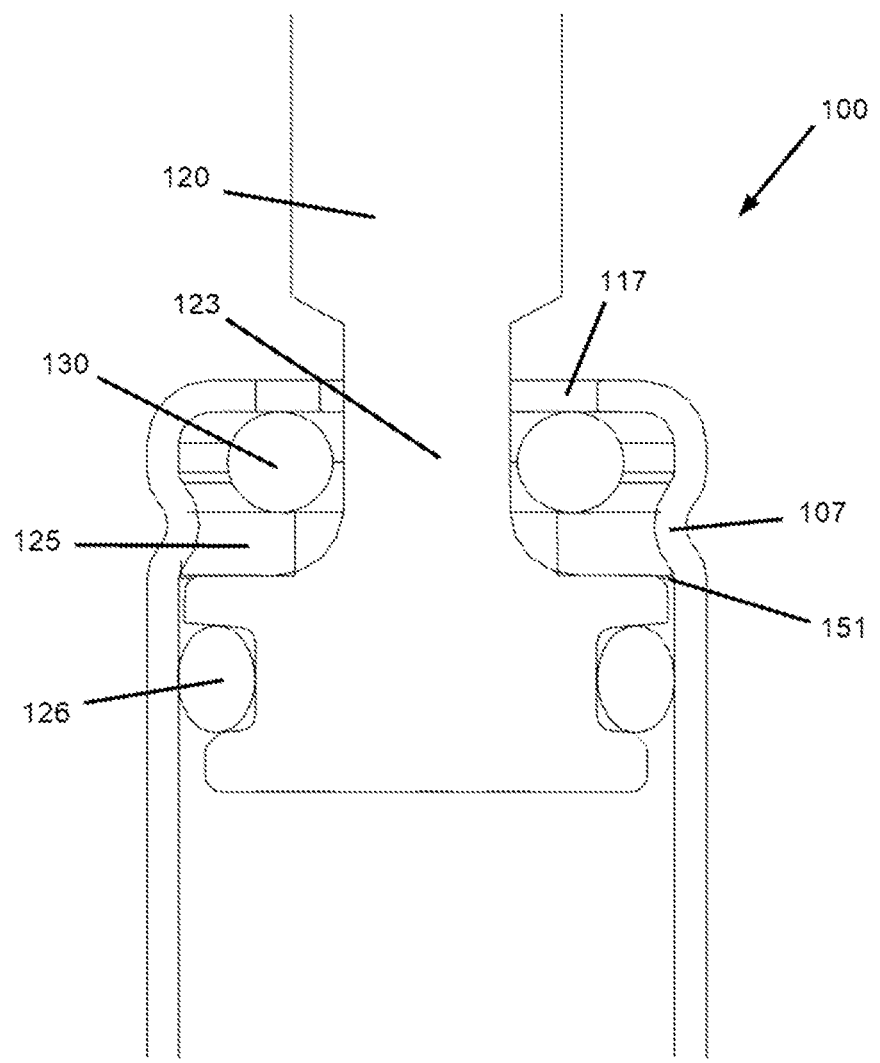
Figure 8B:
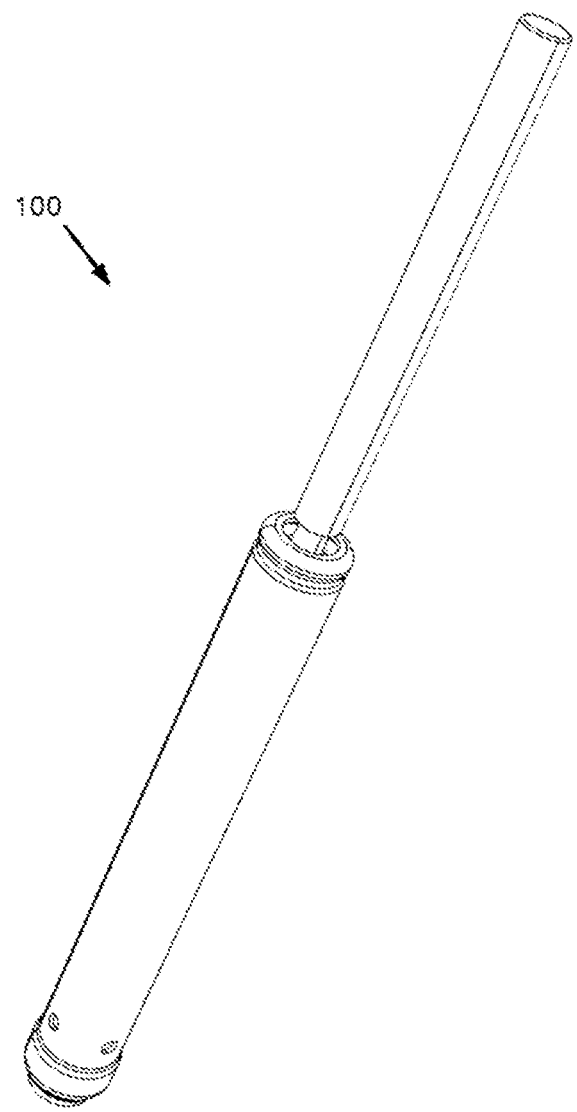

Upon actuation, the piston head 121 is driven along a stroke length within the housing 101 from a proximal end 150 of the stroke length, which is adjacent the shoulder 141 of the sleeve 140, to a distal end 151 of the stroke length, which is adjacent the protrusion 107. When the piston head 121 is at the distal end 151 of the stroke length, the piston 120 is in an extended position, as shown in FIGS. 7B and 8B. This extended position represents the greatest extent to which the piston rod 122 can extend from the housing 101 during normal operation. In the extended position, the damper 125 engages the protrusion 107 and the locking ring 130, absorbing some of the energy of the operation of the actuator 100 to prevent the piston 120 from fully exiting the housing 101. As the piston rod 122 extends further from the housing 101, the wide portion 124 of the piston rod 122 axially passes through the locking ring 130, and the narrow portion 123 of the piston rod 122 is radially adjacent the locking ring 130. When the narrow portion 123 is radially adjacent the locking ring 130, the first end 131 of the locking ring 130 and the second end 132 of the locking ring 130 snap circumferentially toward each other. The inner diameter of the locking ring 130 is greater than the diameter of the narrow portion 123 of the piston rod 122.

Figure 7C:
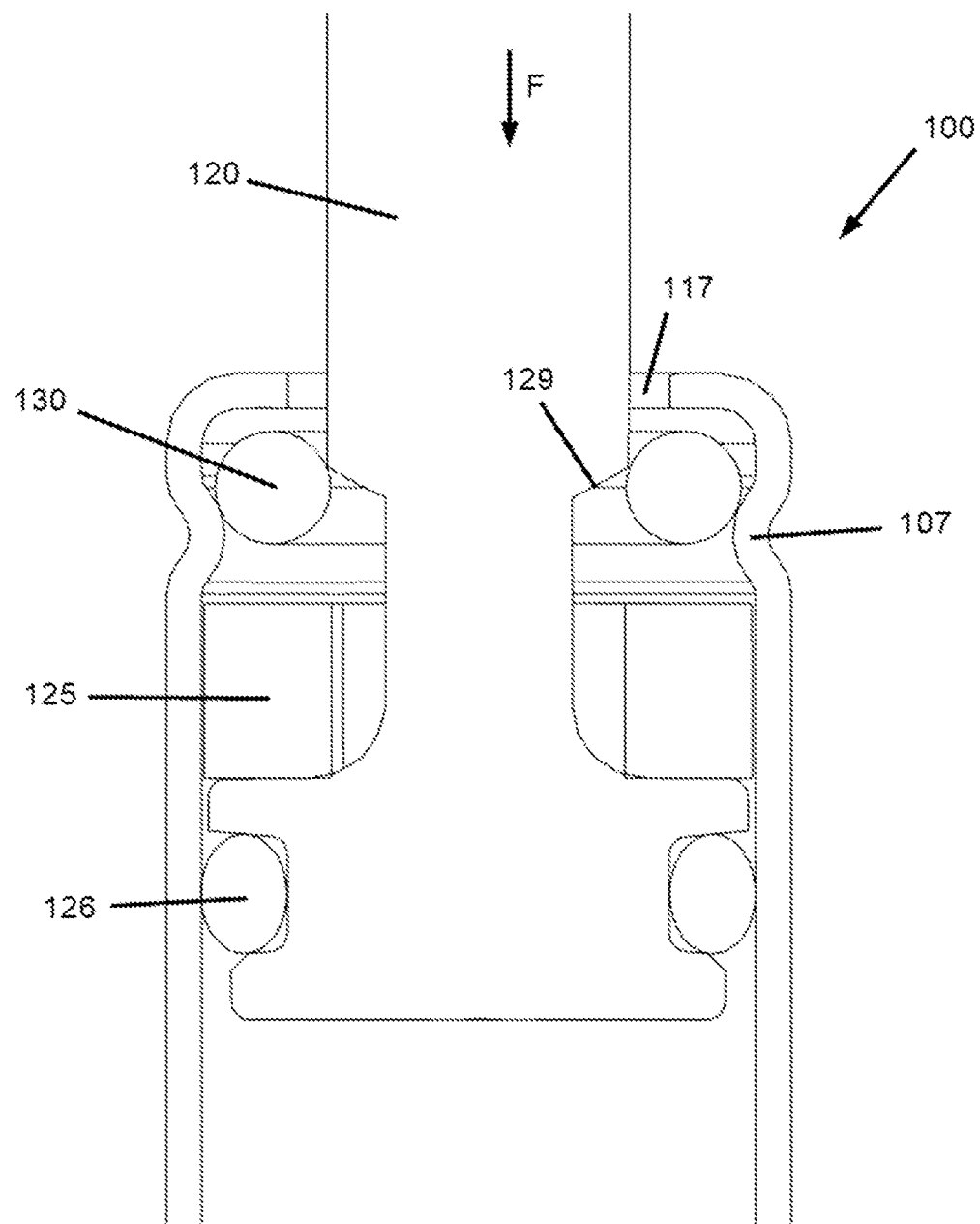
Figure 8C:
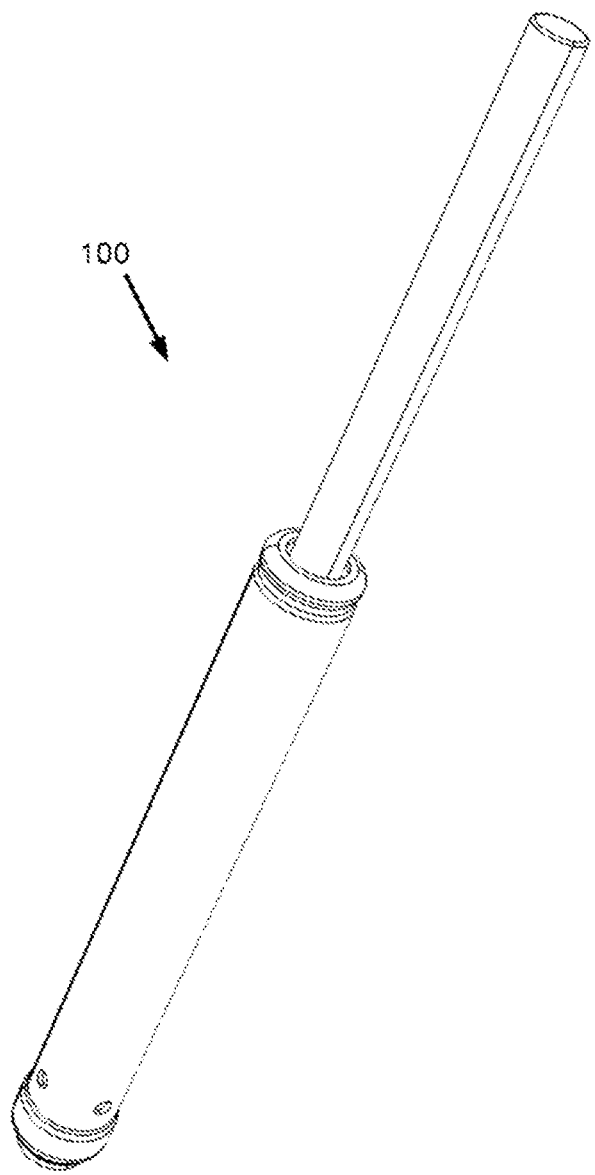

When a force F, such as a person impacting a portion of the vehicle hood, which is shown in FIG. 7C, urges the piston 120 from the extended position toward the retracted position, the locking ring 130 engages both the transition portion 129 of the piston rod 122 and the protrusion 107, thus locking the piston 120 in a locked position, as shown in FIGS. 7C and 8C. The locked position is therefore a position between the extended position and the retracted position. The piston 120 cannot be urged further into the housing 101 from the locked position, thus locking the vehicle hood in an elevated position.

Figure 9A:
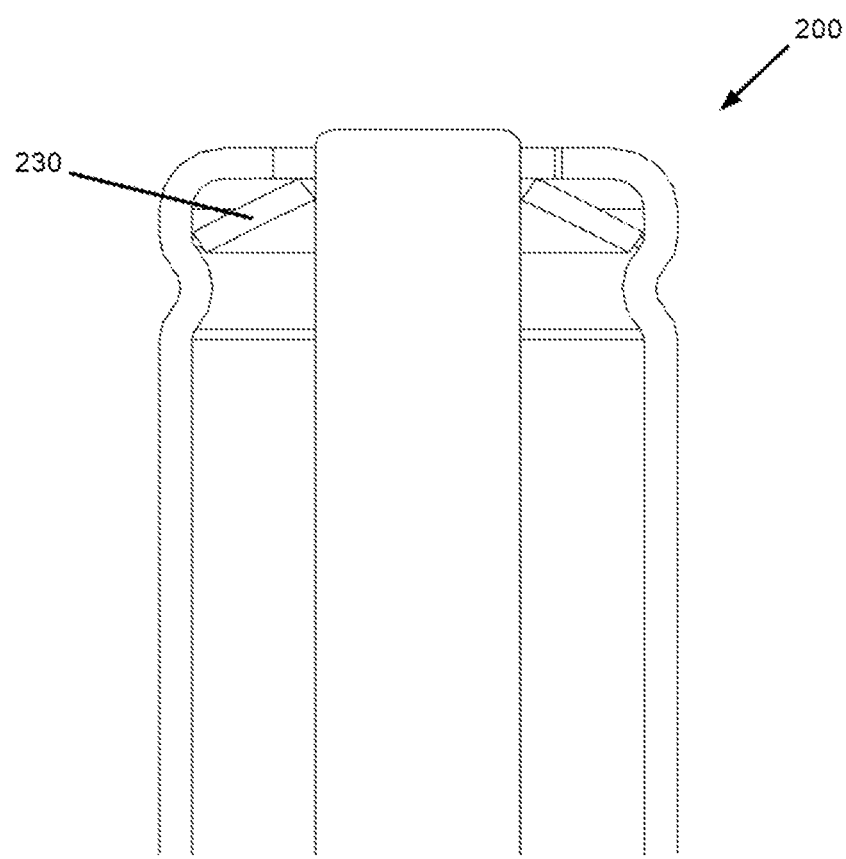
FIGS. 9A-9C are cross-sectional views of an actuator according to another implementation in the retracted position, the extended position, and the locked position, respectively.
Figure 9B:
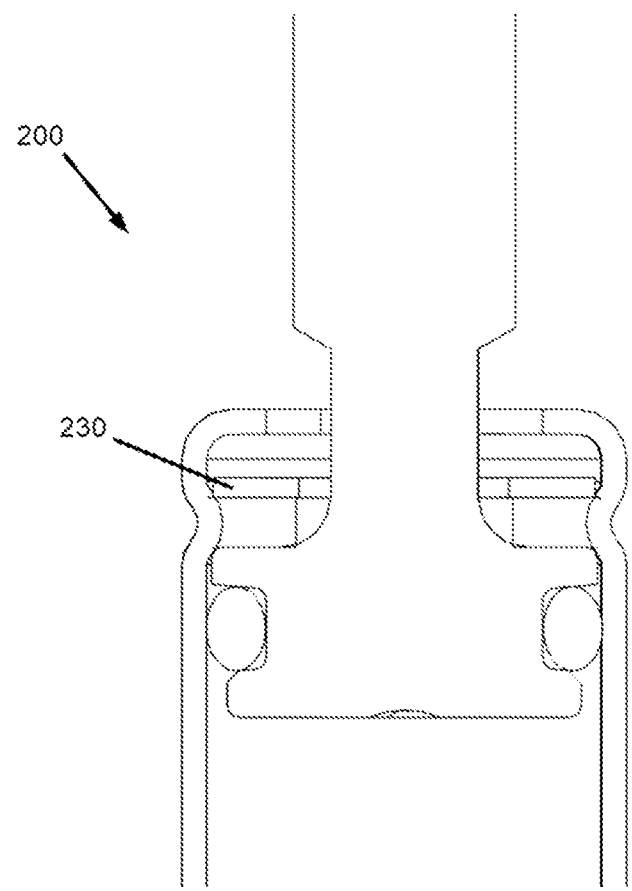
Figure 9C:
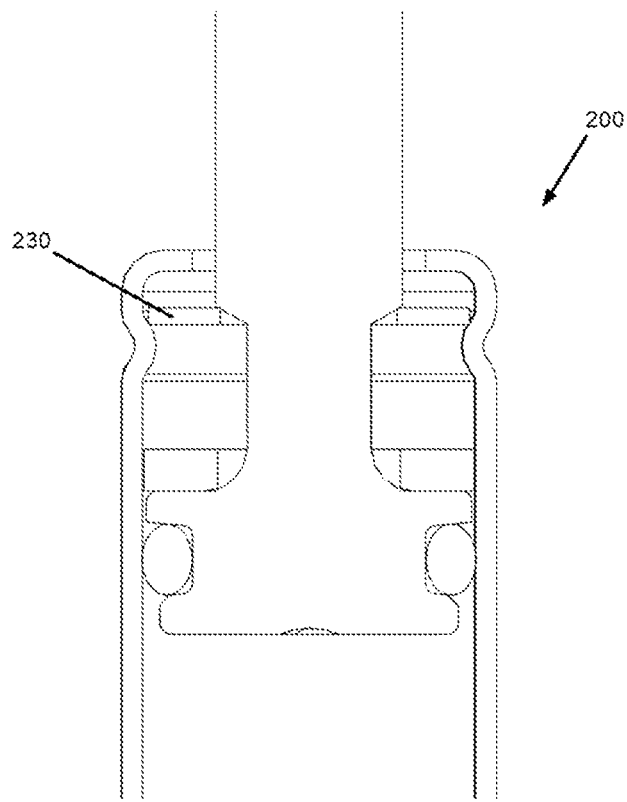
Figure 10:
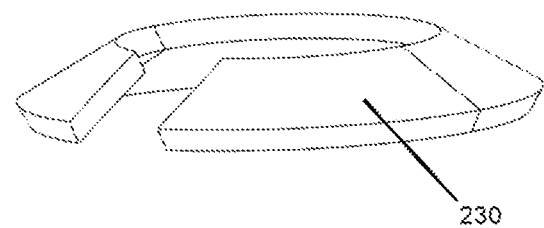
FIG. 10 is a view of a locking ring of the actuator of FIGS. 9A-9C.

Another implementation of an actuator 200 is shown in FIGS. 9A-9C. Actuator 200 is similar to actuator 100 described above, except that actuator 200 includes a locking ring 230, which is a washer snap ring with a rectangular cross section. FIGS. 9A-9C illustrate actuator 200 in the retracted position, extended position, and locked position, respectively. As shown in FIGS. 9A and 10, locking ring 230 takes on a distorted shape when engaging the wide portion 124 of the piston rod 122. Prior to being distorted by the wide portion 124 of the piston rod 122, the inner diameter of the locking ring 230 is less than the outer diameter of the wide portion 124 of the piston rod 122 and is greater than the outer diameter of the narrow portion 123 of the piston rod 122. Accordingly, the locking ring 230 snaps to a flat shape when radially adjacent the narrow portion 123 of the piston rod 122 or the transition portion 129 of the piston rod 122, as seen in FIGS. 9B and 9C, respectively. Because the inner diameter of the locking ring 230 in the flat shape is less than the diameter of the wide portion 124 of the piston rod 122, the locking ring 230 prevents the wide portion 124 of the piston rod 122 from passing axially past the locking ring 230 after the piston rod 122 moves into the extended position. The locking ring 230 may be made from steel. However, in other implementations, the locking ring may be made from any appropriate material to satisfy its intended purpose. In other implementations, the locking ring may have any cross-sectional shape, such as circular, rectangular, square, or any other shape that can satisfy its intended purpose.

A number of implementations have been described. Nevertheless, it will be understood that various modifications may be made without departing from the spirit and scope of the claims. Accordingly, other implementations are within the scope of the following claims.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

The description in the present disclosure has been presented for purposes of illustration but is not intended to be exhaustive or limited to the implementations disclosed.

Many modifications and variations will be apparent to those of ordinary skill in the art without departing from the scope and spirit of the disclosure. The implementations were chosen and described in order to best explain the principles of the actuator and its practical application, and to enable others of ordinary skill in the art to understand the actuator for various implementations with various modifications as are suited to the particular use contemplated.

What is claimed is:

1. An actuator comprising:
    a housing comprising a fixed internal volume, a central axis, an inner surface, a distal end, and a proximal end, the distal end defining a distal end wall extending at least partially radially inwardly toward the central axis, the housing comprising an integrally formed protrusion that extends inwardly toward the central axis;
    a gas generator coupled to the proximal end;
    a piston slidably engaged with the inner surface of the housing, wherein the piston is movable axially from a retracted position to an extended position, wherein a first surface of the piston is disposed adjacent the proximal end of the housing in the retracted position and is disposed adjacent the distal end of the housing in the extended position; and
    a locking ring retained between the distal end wall and the protrusion prior to the piston traveling from the retracted position to the extended position;
    wherein the protrusion has a first inner diameter, and the housing has a second inner diameter between the protrusion and the distal end wall and a third inner diameter between the protrusion and the proximal end, the second and third inner diameters being equal to each other and greater than the first inner diameter;
    wherein the locking ring prevents the piston from traveling from the extended position to the retracted position; and
    wherein the housing further comprises an outer surface that forms a wall with the inner surface, the wall having a thickness that is measured radially from the inner surface to the outer surface, wherein the thickness is constant throughout a length of the wall and the protrusion between the proximal end and the distal end wall of the housing.

2. The actuator of claim 1, wherein the piston comprises a piston head and a piston rod.

3. The actuator of claim 2, wherein the piston head and the piston rod are integrally formed.

4. The actuator of claim 2, wherein the piston rod comprises a wide portion and a narrow portion, the narrow portion being adjacent to the piston head, wherein a diameter of the wide portion is greater than a diameter of the narrow portion.

5. The actuator of claim 4, wherein the locking ring engages the wide portion when the piston is in the retracted position.

6. The actuator of claim 5, wherein the locking ring is disengaged from the wide portion and is radially adjacent the narrow portion when the piston is in the extended position.

7. The actuator of claim 6, wherein the piston rod further comprises a transition portion between the wide portion and the narrow portion, wherein in response to a force urging the piston from the extended position toward the retracted position, the locking ring engages the transition portion.

8. The actuator of claim 7, wherein the transition portion defines a tapered surface that tapers from the wide portion to the narrow portion.

9. The actuator of claim 7, wherein in response to the force urging the piston from the extended position toward the retracted position, the locking ring further engages the protrusion, thereby locking the piston in a locked position.

10. An actuator comprising:
    a housing comprising a fixed internal volume, a central axis, an inner surface, a distal end, and a proximal end, the distal end defining a distal end wall extending at least partially radially inwardly toward the central axis, the housing comprising an integrally formed protrusion that extends inwardly toward the central axis;
    a gas generator coupled to the proximal end;
    a piston slidably engaged with the inner surface of the housing, wherein the piston is movable axially from a retracted position to an extended position, wherein a first surface of the piston is disposed adjacent the proximal end of the housing in the retracted position and is disposed adjacent the distal end of the housing in the extended position;
    a locking ring retained between the distal end wall and the protrusion prior to the piston traveling from the retracted position to the extended position;
    wherein the protrusion has a first inner diameter, and the housing has a second inner diameter between the protrusion and the distal end wall and a third inner diameter between the protrusion and the proximal end, the second and third inner diameters being equal to each other and greater than the first inner diameter;
    wherein the locking ring prevents the piston from traveling from the extended position to the retracted position;
    wherein the piston comprises a piston head and a piston rod;
    wherein the piston rod comprises a wide portion and a narrow portion, the narrow portion being adjacent to the piston head, wherein a diameter of the wide portion is greater than a diameter of the narrow portion; and
    further comprising an energy damper disposed around the narrow portion.

11. The actuator of claim 4, further comprising an energy damper disposed around the wide portion.

12. The actuator of claim 1, wherein the locking ring is a toroidal snap ring with a circular cross section.

13. The actuator of claim 1, wherein the locking ring is a washer snap ring with a rectangular cross section.

14. The actuator of claim 1, wherein the locking ring extends less than 360 degrees around the piston.

15. An actuator comprising:
    a housing comprising a fixed internal volume, a central axis, an inner surface, a distal end, and a proximal end, the distal end defining a distal end wall extending at least partially radially inwardly toward the central axis, the housing comprising an integrally formed protrusion that extends inwardly toward the central axis;
    a gas generator coupled to the proximal end;
    a piston slidably engaged with the inner surface of the housing, wherein the piston is movable axially from a retracted position to an extended position, wherein a first surface of the piston is disposed adjacent the proximal end of the housing in the retracted position and is disposed adjacent the distal end of the housing in the extended position; and
    a locking ring retained between the distal end wall and the protrusion prior to the piston traveling from the retracted position to the extended position;
    wherein the protrusion has a first inner diameter, and the housing has a second inner diameter between the protrusion and the distal end wall and a third inner diameter between the protrusion and the proximal end, the second and third inner diameters being equal to each other and greater than the first inner diameter;

wherein the locking ring prevents the piston from traveling from the extended position to the retracted position; and wherein the housing further defines gas relief openings.

16. The actuator of claim 15, further comprising a sleeve, the sleeve covering the gas relief openings.

17. The actuator of claim 16, wherein the sleeve comprises acrylonitrile butadiene styrene (ABS).

18. The actuator of claim 16, wherein the sleeve defines a shoulder, wherein the first surface of the piston rests on the shoulder in the retracted position.

19. The actuator of claim 16, wherein the sleeve defines a cavity, wherein the gas generator is disposed at least partially within the cavity.

* * * * *